(12) United States Patent
Giannini et al.

(10) Patent No.: US 10,300,747 B2
(45) Date of Patent: May 28, 2019

(54) SELF-SEALING TYRE FOR VEHICLE WHEELS

(71) Applicant: PIRELLI TYRE S.P.A., Milan (IT)

(72) Inventors: Luca Giannini, Milan (IT); Cristiano Puppi, Milan (IT); Marco Nahmias Nanni, Milan (IT); Michela Caprio, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 1091 days.

(21) Appl. No.: 14/366,567

(22) PCT Filed: Dec. 21, 2012

(86) PCT No.: PCT/IB2012/002779
§ 371 (c)(1),
(2) Date: Jun. 18, 2014

(87) PCT Pub. No.: WO2013/093608
PCT Pub. Date: Jun. 27, 2013

(65) Prior Publication Data
US 2014/0345771 A1 Nov. 27, 2014

Related U.S. Application Data

(60) Provisional application No. 61/614,779, filed on Mar. 23, 2012.

(30) Foreign Application Priority Data

Dec. 22, 2011 (IT) ............................... MI2011A2360

(51) Int. Cl.
*B60C 19/12* (2006.01)
*B29C 73/16* (2006.01)
(Continued)

(52) U.S. Cl.
CPC .......... *B60C 19/122* (2013.01); *B29C 73/163* (2013.01); *B29C 73/22* (2013.01);
(Continued)

(58) Field of Classification Search
CPC ..................................................... B60C 19/122
See application file for complete search history.

(56) References Cited

U.S. PATENT DOCUMENTS 4,228,839 A * 10/1980 Bohm ................ B29D 30/0005
152/504
5,085,942 A * 2/1992 Hong .................... B29C 73/163
152/502

(Continued)

FOREIGN PATENT DOCUMENTS

EP          2 133 219        12/2009
JP          2005-068173       3/2005
(Continued)

OTHER PUBLICATIONS

International Search Report from the European Patent Office for International Application No. PCT/IB2012/002779, dated Mar. 19, 2013.

(Continued)

*Primary Examiner* — Kendra Ly
(74) *Attorney, Agent, or Firm* — Finnegan, Henderson, Farabow, Garrett & Dunner, L.L.P.

(57) ABSTRACT

A self-sealing tire for vehicle wheels includes: a carcass structure, a tread band applied in a radially external position to the carcass structure at least in a crown area of the tire, a liner applied in a radially inner position to the carcass structure, and a layer of sealing material applied in a radially inner position to the carcass structure and which extends axially at least in all the crown area of the tire in which the sealing material includes a partially chemically crosslinked (Continued)

composition including an unsaturated styrene thermoplastic elastomer.

27 Claims, 1 Drawing Sheet

(51) Int. Cl.
| | |
|---|---|
| B29C 73/18 | (2006.01) |
| B29D 30/08 | (2006.01) |
| B29D 30/06 | (2006.01) |
| B29C 73/22 | (2006.01) |
| B60C 1/00 | (2006.01) |
| C08L 21/00 | (2006.01) |
| B29K 9/00 | (2006.01) |
| B29K 105/00 | (2006.01) |
| B29K 105/24 | (2006.01) |

(52) U.S. Cl.
CPC ............ *B29D 30/0685* (2013.01); *B60C 1/00* (2013.01); *B60C 1/0008* (2013.01); *C08L 21/00* (2013.01); *B29C 73/16* (2013.01); *B29C 73/166* (2013.01); *B29C 73/18* (2013.01); *B29D 2030/0691* (2013.01); *B29K 2009/00* (2013.01); *B29K 2105/0005* (2013.01); *B29K 2105/0038* (2013.01); *B29K 2105/0088* (2013.01); *B29K 2105/243* (2013.01); *B29K 2105/246* (2013.01); *B60C 19/12* (2013.01); *Y10T 152/10684* (2015.01)

(56) References Cited

U.S. PATENT DOCUMENTS

| | | | | |
|---|---|---|---|---|
| 2006/0089447 | A1* | 4/2006 | Robertson | B60C 1/00 524/493 |
| 2009/0160078 | A1 | 6/2009 | Abad et al. | |
| 2010/0032070 | A1 | 2/2010 | Albert et al. | |
| 2010/0051158 | A1* | 3/2010 | Albert | B29C 73/18 152/503 |
| 2010/0300593 | A1* | 12/2010 | Merino Lopez | B29C 73/20 152/504 |
| 2011/0061782 | A1* | 3/2011 | Merino Lopez | B60C 5/04 152/503 |
| 2011/0180193 | A1* | 7/2011 | Custodero | B29C 73/163 152/503 |
| 2011/0198009 | A1* | 8/2011 | Merino-Lopez | B29C 73/163 152/502 |
| 2012/0199260 | A1* | 8/2012 | Merino Lopez | B29C 73/163 152/504 |
| 2012/0234449 | A1* | 9/2012 | Greiveldinger | B29C 73/163 152/502 |
| 2012/0273109 | A1* | 11/2012 | Merino Lopez | B29C 47/0021 152/502 |
| 2013/0203913 | A1 | 8/2013 | Voge et al. | |
| 2014/0138004 | A1* | 5/2014 | Voge | B29C 73/163 152/502 |

FOREIGN PATENT DOCUMENTS

| | | |
|---|---|---|
| JP | 2010-241141 | 10/2010 |
| WO | WO 99/62998 | 12/1999 |
| WO | WO 2008/154996 | 12/2008 |
| WO | WO 2009/006915 | 1/2009 |
| WO | WO 2009/059709 | 5/2009 |
| WO | WO 2009/143895 | 12/2009 |
| WO | WO 2009/156049 | 12/2009 |
| WO | WO 2009/156050 | 12/2009 |
| WO | WO 2009/156370 | 12/2009 |
| WO | WO 2011/064698 | 6/2011 |
| WO | WO 2001/092123 A1 | 8/2011 |

OTHER PUBLICATIONS

Written Opinion of the International Searching Authority from the European Patent Office for International Application PCT/IB2012/002779, dated Mar. 19, 2013.
http://unionchem.tripod.com/rubber/id7.html.
https://atdmco.com/wiki-what+is+extender+rubber+oil-280.html.

* cited by examiner

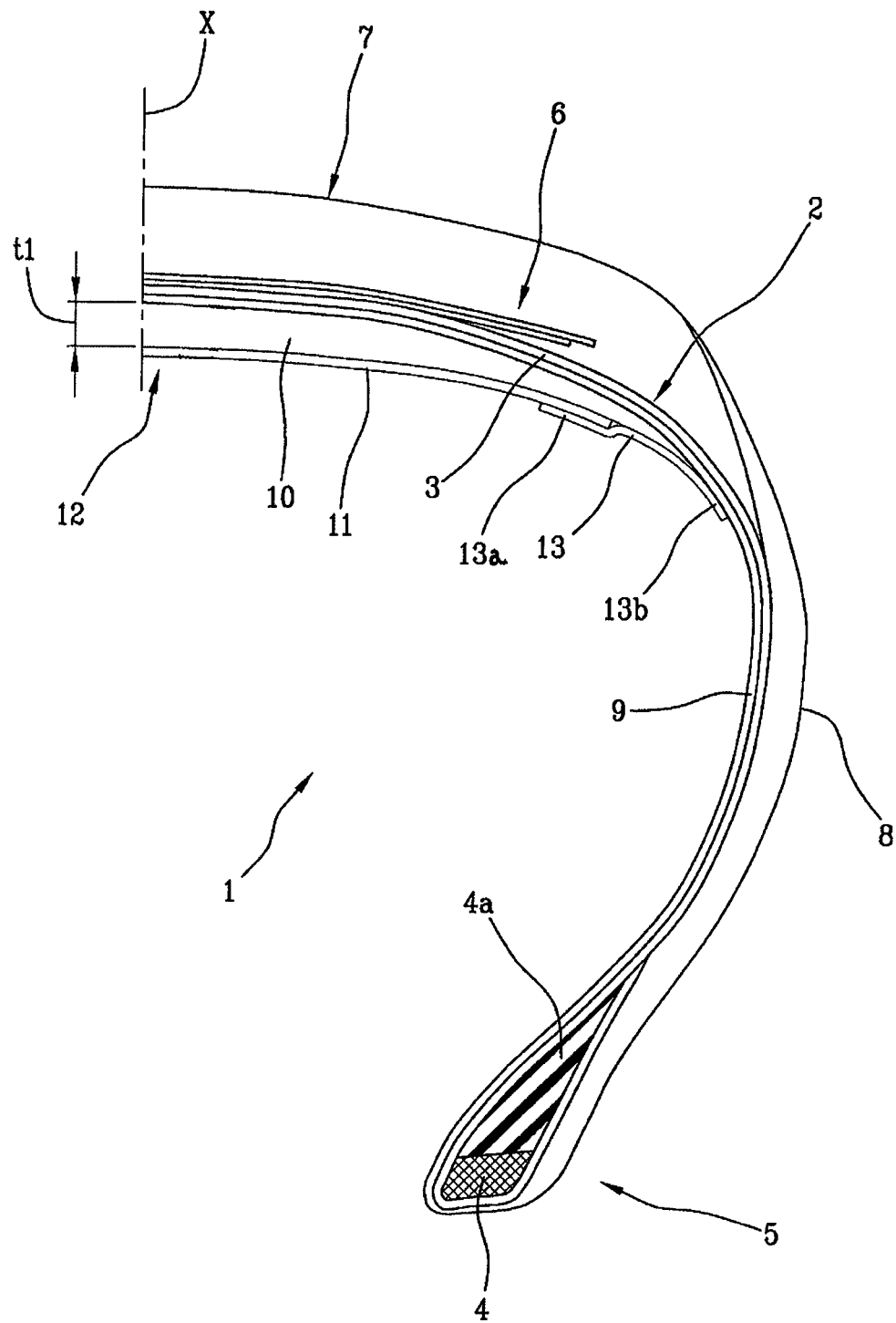

SELF-SEALING TYRE FOR VEHICLE WHEELS

CROSS REFERENCE TO RELATED APPLICATIONS

This application is a national phase application based on PCT/IB2012/002779, filed Dec. 21, 2012, and claims the priority of Italian Patent Application No. MI2011A002360, filed Dec. 22, 2011, and the benefit of U.S. Provisional Application No. 61/614,779, filed Mar. 23, 2012, the content of each application being incorporated herein by reference.

FIELD OF THE INVENTION

The present invention relates to a self-sealing tyre for vehicle wheels and, more particularly relates to a self-sealing tyre for vehicle wheels comprising a partially cross-linked thermoplastic elastomer and a process for the preparation of said tyre.

PRIOR ART

Self-sealing tyres are able to autonomously sealing holes caused by a sharp element, for example by a nail, without needing an external action.

The self-sealing of the tyre must ensure that the tyre maintains for a suitable time its performance characteristics when operating, both in case of presence of the sharp element in the tyre, both in case of ejection or removal of the element so as not to cause any risk of drivability of the vehicle also under non-optimal driving or street conditions.

Self-sealing tyres generally comprise at least one inner layer of sealing material which is able to grip to the sharp element and can also flow or to be dragged into the inner part of the hole when the element is removed, sealing the hole in that way and preventing the air outflow from the tyre.

In self-sealing tyres styrene thermoplastic elastomers were used for the self-sealing layer for the characteristics of high stickiness and low modulus of such polymers.

US20090160078 discloses a self-sealing gel comprising a styrene thermoplastic elastomer (TPS) such as block copolymer styrene/butadiene/styrene (SBS), styrene/isoprene/styrene (SIS), styrene/butadiene/isoprene/styrene (SBIS), styrene/isobutylene/styrene (SIBS), styrene/ethylene/butylene/styrene (SEBS), styrene/ethylene/propylene/styrene (SEPS), styrene/ethylene/ethylene/propylene/styrene (SEEPS) and mixtures of said copolymers and an extension oil, for example polyisobutylene. The composition is used for the preparation of a self-sealing layer that can be the innermost layer of the tyre structure or can be applied between two rubber layers or any other elastomeric material and placed in the internal structure of the tyre.

WO99/62998 discloses a self-sealing composition comprising 100 parts by weight of a styrene thermoplastic elastomer, 110-190 parts by weight of an adhesive agent, 80-140 parts by weight of a liquid plasticizer and 2-20 parts by weight of an additive. The composition is inserted in a molten state in the internal part of the tyre.

EP 2133219 discloses a tyre comprising a self-sealing layer placed on the internal side of the tyre in correspondence with the tread portion. The self-sealing layer is a gel based on silicone, urethane, styrene or ethylene compounds.

WO 2008/154996 discloses a tyre with a multilayer self-sealing laminate comprising at least a first elastomeric gas-tight layer which includes a block polystyrene and polyisobutylene copolymer thermoplastic elastomer and optionally an extension oil up to 100 pce (parts per hundred parts by weight of elastomer) and at least a second self-sealing elastomeric layer which includes a styrene thermoplastic elastomer equal or different from the first elastomer and an extension oil in an amount higher than 200 pce. The multilayer laminate covers the entire inner wall of the tyre from bead to bead.

WO 2009/059709 discloses a self-sealing tyre comprising a self-sealing composition which comprises at least a styrene thermoplastic elastomer as a predominant elastomer, more than 200 phr of an extension oil and more than 20 phr of a hydrocarbon resin with a glass transition temperature higher than 0° C. The self-sealing layer covers the entire inner wall of the tyre from bead to bead.

WO 2009/156049 discloses a tyre with a self-sealing multilayer laminate comprising at least three layers: a first air-tight layer having a first elastomeric composition comprising at least 50 pce of a diene elastomer, a second self-sealing layer having an elastomeric composition comprising at least 50 pce of a saturated styrene thermoplastic elastomer and more than 200 pce of an extension oil and a third adhesive layer interposed between the first two layers having a composition comprising at least 30 pce of an unsaturated styrene thermoplastic elastomer. The multilayer laminate covers the entire inner wall of the tyre from bead to bead.

WO 2009/156050 discloses a self-sealing elastomeric composition comprising at least 30 pce of a saturated styrene thermoplastic elastomer, at most 70 pce of an unsaturated styrene thermoplastic elastomer and more than 200 pce of an extension oil. The self-sealing layer prepared with said composition, optionally associated with an impermeable layer, covers the entire internal wall of the tyre from bead to bead.

WO 2009/156370 discloses a method for applying a layer of self-sealing material on the inner wall of a tyre, the layer of self-sealing material being pre-shaped and comprising at least a styrene thermoplastic elastomer and more than 200 pce of an extension oil.

US 2010/0032070 discloses a self-sealing tyre in which at least a portion of the inner side is coated with a self-sealing layer comprising a styrene thermoplastic elastomer.

US 2010/0051158 discloses a self-sealing elastomeric composition for tyres which comprises a styrene thermoplastic elastomer as predominant elastomer and an extender oil in an amount between 200 and 700 pce.

WO 2009/143895 discloses a self-sealing tyre comprising a self-sealing layer radially applied between an impermeable layer and a carcass ply and comprising from 55 phr to 95 phr of at least a natural or synthetic elastomer, from 5 phr to 45 phr of at least a pre-crosslinked elastomer, preferably a styrene-butadiene elastomer, from 5 phr to 50 phr of at least a tackifying agent and from 1 phr to 40 phr of a reinforcing filler.

A self-sealing tyre comprising a polyamide or polyester thermoplastic film and a self-sealing layer associated and supported to said thermoplastic film is described in WO 2011/064698 on behalf of the Applicant.

SUMMARY OF THE INVENTION

According to the observations of the Applicant, the self-sealing layer can be applied on the finished tyre but it is preferable to realize and apply a semi-worked layer of sealing material during the production of the tyre for preventing subsequent treatments at the end of the usual production cycle.

According to the Applicant, the self-sealing material should be industrially workable using conventional apparatus. For example it should have enough plasticity to enable the extrusion of the semi-worked material with a predefined geometry and have a dimensional stability under storage and assemblage conditions of the tyre.

From a working point of view, the Applicant has noted that the self-sealing of the operating tyre is not exhausted with the sealing of a hole caused by a sharp element.

According to the observations of the Applicant, the self-sealing arises a problem of selective control of the sealing itself, in order to exclude the repairing of too big holes that can cause the structural weakening of the tyre, to guarantee a safe use of the perforated and self-repaired tyre.

The Applicant has particularly noted that, as the sharp element has produced a puncture of excessive size and, in any case, beyond a certain predetermined diameter, such puncture might have caused the structural weakening of the tyre so that the self-sealing of the puncture, at the removal of the sharp element from the tyre, could not enable the driver to become aware of the extent of the damage suffered by the tyre. Consequently, under this situation, the tyre could no longer ensure reliability and continuity of its operational performances.

The Applicant has observed that the structural damage is more limited and the self-sealing is more effective when the sharp element that has caused the puncture is ejected or removed in a short time from the tyre (for example during rolling) compared to when the sharp element remains stuck for a long time during the working of the tyre and this phenomenon is more evident during hard working conditions of the tyre or under high ambient temperature conditions.

The ejection of the sharp element is an unpredictable event that makes the selective self-sealing of the holes more difficult to rule.

The Applicant has noticed that the self-sealing tyres described in the prior art, containing at least a self-sealing material based on styrene thermoplastic elastomers (TSP), have some drawbacks:
  saturated styrene thermoplastic elastomers, that do not flow up to about 100° C. and then are able to ensure the dimensional stability of the sealing layer during hard working of the tyre, show a very reduced stickiness that severely restricts the sealing capability according to the adhesive mechanism of the sealing layer to the sharp element. Saturated styrene thermoplastic elastomers do not seem to have the co-vulcanization ability with diene elastomers and consequently would require the use of complex structures for being incorporated into the tyres.
  unsaturated styrene thermoplastic elastomers, which show the co-vulcanization capability with diene elastomers and have a significant stickiness, do not seem to guarantee the dimensional stability of the sealing layer when the tyre is used under driving or ambient conditions that cause a high operational temperature, higher than 70° C.

The Applicant has observed that, in case of high temperature, the layer of sealing material tends to move and redistribute in a non-uniform way or in any case in a different way with respect to the original layer, causing an imbalance of the tyre with consequent less safety and lower performances during the use of the vehicle. Said tyres would be inclined to decrease their self-sealing capability with the increase of the temperature both because of the loss of cohesion of the sealing layer, which could be thrown out from the punctures to be sealed, and both because of the movement of the sealing that should inevitably leave some parts with a reduced layer of sealing or even completely without it. According to the Applicant, the selective control of the sealing seems to be connected to some properties of the sealing layer that enable the correct working of the tyre also at high temperatures, for example higher than 70° C.

The Applicant refers to temperatures higher than 70° C., generally between 70° C. and 100° C., as has observed that such temperatures are usually reached by tyres during hot periods or in hot places and/or under driving conditions that require a hard working from tyres.

According to the observations of the Applicant, the properties of the sealing material that enable an effective working, can be expressed as:
  stickiness, to adhere the sealing material to the sharp element that perforates into the tyre following it during the ejecting phase so as to seal the puncture generated by such sharp element and to adhere to the liner;
  low modulus, to enable the sealing material a deformation such that can be dragged into the puncture by the body that perforates the tyre;
  cohesion, so as to deform without breaking up (to avoid its ejection from the puncture by the push of the inflating gas and by the centrifugal effect);
  dimensional stability because the sealing material should not flow during the rolling of the tyre to avoid, for example, the creation of "flat spotting" phenomena, balance problems, loss of sealing capability in areas which should have a reduced thickness of residual sealant.

As for the preparation process of the self-sealing tyre, the requirement of plasticity during the packaging phase of the sealing layer is further desired; the sealing layer should be preferably fluid under process conditions so it can be extruded according to a predefined geometry.

The sealing material should preferably have dimensional stability in storage and assemblage conditions of the sealing layer (it must not flow at cold to preserve the predefined geometry of the layer).

The above mentioned needs are at least partly in conflict each other.

In particular such conflict is critical for vehicle tyres intended to work at high temperatures or in particularly hard drive conditions.

The Applicant has found that it is possible to selectively control the self-sealing capability of a tyre, mounted on a vehicle wheel, punctured by a sharp element as a nail or similar, through a layer of sealing material comprising a sealing material obtained by partially chemically crosslinking a composition comprising at least an unsaturated styrene thermoplastic elastomer and a prefixed amount of a crosslinking agent.

The Applicant has observed that the layer of sealing material comprising a partially chemically crosslinked composition comprising at least a styrene thermoplastic elastomer shows high stickiness, low modulus, high cohesion and dimensional stability characteristics at the operating temperatures of the tyre.

According to the Applicant these characteristics are surprising, as in chemical crosslinking of styrene thermoplastic elastomers is common that the styrene portion interferes in radical crosslinking reactions and that the chemical crosslinking of styrene thermoplastic elastomers decreases their adhesive properties.

The Applicant has observed that the obtainable crosslinking degree is correlated to the amount of the crosslinking agent which is added to the composition comprising the unsaturated styrene thermoplastic elastomer.

The Applicant has found that the amount of equivalents of the crosslinking agent to add in order to obtain the desired crosslinking degree and then the sealing and dimensional stability characteristics is inversely proportional to the moment of torsion strength of the composition of sealing material measured before crosslinking. Once the compound to use as a crosslinking agent is defined, the corresponding value in phr can be expressed through simple stoichiometric calculations.

The layer of sealing material comprising a composition comprising unsatured styrene elastomers and agents able to introduce their partial chemical crosslinking during vulcanization of the tyre has plasticity characteristics of the semi-worked material, under extrusion conditions, and dimensional stability of the same, during storage and transport, that enable the application during the preparation of tyres.

According to a first object the present invention relates to a self-sealing tyre for vehicle wheels comprising:
a carcass structure, a tread band applied in a radially external position to said carcass structure at least in a crown area, a liner applied in a radially inner position to said carcass structure, a layer of sealing material applied in a radially inner position said carcass structure and which extends axially at least in all the crown area of the tyre, in which said layer of sealing material comprises a composition comprising at least an unsaturated styrene thermoplastic elastomer partially chemically crosslinked through the addition of a predefined amount of a crosslinking agent.

According to another object, the present invention relates to a process for the preparation of a self-sealing tyre for vehicle wheels comprising:
preparing a layer of sealing material;
forming a green tyre comprising said layer of sealing material and at least a liner, a carcass and a tread band;
conforming, molding and vulcanizing said green tyre;
wherein the layer of sealing material comprises at least a composition comprising at least an unsaturated styrene thermoplastic elastomer and a predefined amount of a crosslinking agent.

The present invention in one or more of its preferred embodiments can have one or more of the following preferred characteristics.

Preferably said self-sealing tyre for vehicle wheels is obtained by vulcanizing a green self-sealing tyre comprising at least a layer of sealing material comprising a sealing composition comprising:
a) at least about 20 phr of at least an unsaturated styrene thermoplastic elastomer;
b) from 0 phr to 80 phr of at least a diene elastomer;
c) from about 0.1 phr to about 6 phr of a crosslinking agent;
in which the amount of the crosslinking agent in the sealing composition being such that:

$V \times S'(10\ Hz) = A$ wherein:
V is the amount of the crosslinking agent expressed in meqv/100 g of composition;
S' is the value of the moment of torsion strength in phase with the deformation of the sealing material measured before crosslinking, expressed in dNm, measured with an oscillating rheometer at 50° C., at 25% of dynamic deformation and at 10 Hz;
A is a parameter with value higher than about 1.4.

Preferably the value of parameter A is lower than about 10.

Preferably the value of parameter A is from about 1.7 to about 7.

Preferably said sealing composition comprises:
a) at least 30 phr of at least an unsaturated styrene thermoplastic elastomer.

Preferably said sealing composition comprises:
a) from about 40 phr to about 100 phr of at least one unsaturated styrene thermoplastic elastomer.

Preferably said sealing composition comprises:
b) from about 10 phr to about 50 phr of at least one diene elastomer.

Preferably said sealing composition comprises:
c) at least about 20 phr of at least one adhesive resin.

Preferably said sealing composition comprises:
c) from about 30 phr to about 200 phr of at least one adhesive resin.

Preferably said sealing composition comprises:
d) from about 10 to about 200 phr of an extension oil.

The term "phr" stands for parts by weight of a given component of the elastomeric composition per 100 parts by weight of the elastomeric polymer.

The amount of the crosslinking agent is expressed in milliequivalents/100 g of composition to free itself from the nature of the selected agent:
in case of sulfur systems, V represents milliequivalents of free or releasable sulfur atoms per 100 g of composition;
in case of peroxides, V represents milliequivalents of reactive peroxide groups per 100 g of composition.

The Applicant deems more useful to consider the amount of crosslinking agent as a function of the total amount of the mass of the mixture, rather than of the only polymer, in order to better take into account the effective dilution of the crosslinker in the mixture, taking into account the high amount of organic material that it is present in this type of mixtures with respect to eventual fillers.

The optimal amount of the optimal crosslinking agent is then in relation to the total mass of the composition and its total module measured during the dynamic torque moment: the more the composition is rich in oil and resins, the more it will be adhesive but the lower will be its cohesion and its modulus and a greater amount of crosslinking agent will be required to achieve enough dimensional stability at a high temperature.

Mixtures with lower amounts of plasticizers will have a higher modulus and will require a lower amount of crosslinking agent to achieve the optimal situation.

According to the Applicant for A values lower than 1.4 the sealing material in the self-sealing tyre will be excessively fluid while for A values higher than 10 the sealing material will not be adhesive.

Exact values of A parameter are defined by the expert in the field, from time to time, in relation to the characteristics and conditions of use of the self-sealing tyre as below exemplified.

A sealing material comprising, for example, a composition comprising at least an unsaturated styrene thermoplastic elastomer with a S' value (50° C., 10 Hz, 25% deformation) equal to 1 dNm and a receipt with a total amount of 300 phr, will require an amount of milliequivalents of crosslinking agent V higher than 1.4, V preferably lower than 10 meqv/100 g mixture, more preferably V will be between 1.7 and 7 meqv/100 g mixture.

By selecting sulfur as crosslinking agent, an amount of sulfur (equivalent weight=32 g/eqv) higher than 0.13 phr, preferably lower than 0.96 phr, preferably between 0.16 phr and 0.67 phr will be used—the selected amount can be 0.5-0.6 phr for a vehicle tyre, taking into account the low stiffness of the sealing composition and consequent need to significantly crosslinking it.

With 0.5 phr of sulfur V=(1000*0.5/32)*(100/300)=5.2 meqv/100 g; A=5.2 [meqv/100 g]*1 [dNm]=5.2. For a tyre for heavy vehicle an amount of 0.3-0.4 phr is preferably selected as the need of dimensional stability is less important than the adhesive feature which should be privileged.

Moreover, it is worth recalling that also about 1 phr of ZnO, 0.5-1 phr of stearic acid and about 0.4-0.7 phr of sulphenamide accelerating agent to activate sulfur should be typically added with sulfur.

By selecting dicumylperoxide as crosslinking agent, in the sealing composition (300 phr total, S'=1) a peroxide amount higher than 1.1 phr, preferably lower than 8.1 phr, preferably between 1.4 and 5.7 phr will be used in the sealing composition—the effectively selected amount can be of about 3 phr for a vehicle tyre. For a tyre for heavy vehicles an amount of about 2 phr should be selected. Dicumylperoxide has one reactive peroxide group per molecule and accordingly an equivalent weight equal to the molecular weight (270 g/eqv); with 2 phr of dicumylperoxide in the sealing composition it results that V=(1000*2/270)*(100/300)=2.5 meqv/100 g; A=2.5 [meqv/100 g]*[dNm]=2.5.

By selecting 2,5-dimethyl-2,5-di(t.butyl-peroxy)hexane (DBPH) as crosslinking agent, a peroxide amount higher than 0.6 phr, preferably lower than 4.4 phr, preferably between 0.7 and 3.0 phr will be used in the sealing composition (300 phr total, S'=1). The effectively selected amount can be of about 2 phr for a vehicle tyre. For a tyre for heavy vehicles an amount of about 1.5 phr should be selected. DBPH has two reactive peroxide groups per molecule and accordingly an equivalent weight equal to half of the molecular weight (145 g/eqv): with 1.5 phr of DBPH in the sealing composition it results that V=(1000*1.5/145)*(100/300)=3.4 meqv/100 g; A=3.4 [meqv/100 g]*1 [dNm]=3.4.

The ranges of number values include anyone of the combinations of the indicated maximum and minimum points and include in their internal part anyone of the intermediate ranges that can be or not be explicitly enumerated in the present description.

The partial chemical crosslinking of the composition comprising at least an unsaturated styrene thermoplastic elastomer is achieved during vulcanization of the self-sealing green tyre.

The expression "chemical crosslinking" is used to distinguish a crosslinking with the formation of covalent bonds from a "physical crosslinking" typically due to the polystyrene domains of the block copolymer.

The Applicant believes that the sealing capability of the sealing material can be related both to its viscoelastic characteristics and to its adhesiveness: the first characteristics enable the material forming the layer of sealing material to flow into the puncture while the second enable the dragging of the material which is in contact with the moving sharp element.

Such sealing capability of the layer of sealing material is not particularly affected by the operating temperature of the tyre and, in particular, it remains unchanged when the tyre is used in drive or ambient conditions that cause a high operating temperature, particularly higher than 70° C.

According to a preferred embodiment said self-sealing tyre for vehicle wheels comprises: a carcass structure, a tread band applied at a radially external position to said carcass structure at least in a crown region, at least one liner applied at a radially internal position to said carcass structure, one sealing complex applied in a radially internal position to the liner and axially extending at least for all the crown region of the tyre; said sealing complex comprising at least one self-supporting thermoplastic film and one layer of sealing material associated with and supported by said self-supporting thermoplastic film.

The self-supporting thermoplastic film is preferably radially internal to the layer of sealing material.

Said layer of sealing material is preferably placed directly in contact with the liner.

Said sealing layer has preferably a maximum thickness lower than about 6 mm.

Said self-supporting thermoplastic film has a maximum thickness lower or equal than 50 μm (micron).

The preparation of the layer of sealing material preferably comprises:
feeding in a mixer comprising a housing, at least a screw revolving assembled in said housing including at least a feed opening and a discharge opening said sealing composition comprising:
a) at least about 20 phr of at least an unsaturated styrene thermoplastic elastomer:
b) from 0 phr to about 80 phr of at least a diene elastomer;
c) from about 0.1 phr to about 6 phr of a crosslinking agent;
wherein the amount of the crosslinking agent in the sealing composition is such that:

$$V \times S'(10\ Hz) = A$$

wherein:
V is the amount of the crosslinking agent expressed in meqv/100 g of composition;
S' is the value of the moment of torsion strength in phase with the deformation of the sealing material detected before crosslinking, expressed in dNm, measured with an oscillating rheometer at 50° C., at 25% of dynamic deformation and at 10 Hz;
A is a parameter with value higher than about 1.4;
mixing said sealing composition;
discharging said sealing composition from the mixer using the discharge opening.

The value of parameter A is preferably lower than about 10.

The value of parameter A is preferably from about 1.7 to about 7.

Furthermore the preparation of the layer of sealing material preferably comprises the feeding of at least an extension oil to said mixer.

Furthermore the preparation of the layer of sealing material preferably comprises the feeding of at least an adhesive resin to said mixer.

At least an unsaturated styrene thermoplastic elastomer, at least a diene elastomer, at least an extension oil, at least an adhesive resin are fed in the preceding indicated amounts.

The mixing of said sealing composition is preferably carried out at a temperature from about 20° C. to about 300° C.

The mixing of said sealing composition is preferably carried out at a temperature from about 40° C. to about 260° C.

Said mixer is preferably a Sigma mixer (Z-blades).

Said mixer is preferably a multi screw extruder.

Said extruder is preferably a co-rotating twin screw extruder.

Said sealing material is preferably obtained in the form of a continuous tape or in the form of a divided product.

Preferably, the unsaturated styrene thermoplastic elastomer (a) is a styrene polymer selected among block copolymer styrene/butadiene/styrene (SBS), styrene/isoprene/styrene (SIS), styrene/butadiene/isoprene/styrene (SBIS) and mixtures thereof, optionally further comprising the corresponding thermoplastic di-block elastomer such as styrene-butadiene (SB) and styrene-isoprene (SI).

Block copolymer styrene/isoprene/styrene or mixtures of one or more unsaturated styrene thermoplastic elastomers comprising at least 50% of block copolymer styrene/isoprene/styrene are particularly preferred.

The block copolymer has preferably a styrene content from about 10% to about 30%, more preferably from about 12% to about 18%.

The block copolymer has preferably a "di-block" percentage lower than 70%, more preferably lower than 60%.

The "di-block" percentage is preferably between 15% and 55%.

Di-block percentage means the block polymer percentage consisted of only two segments: a polystyrene and an elastomeric one.

Although such "di-blocks" are present in the block polymers consisted of three segments—styrene-elastomer-styrene—and are considered as an impurity due to the imperfect efficiency of the "living polymerization", the Applicant believes that the presence of "di-blocks" can be advantageously modulated to improve the qualities of the sealing material.

It is believed that to a higher di-block percentage corresponds a higher stickiness but a lower modulus and cohesion of the sealing material.

Such copolymer are for example sold with the trademark Europrene® SOL T190, T9133 by Polimeri Europa, Vector® 4113, 4114 by Dexco Polymers, Kraton® D1111, D1112 and D1107J by Kraton.

The self-sealing material comprises a styrene thermoplastic elastomer and a crosslinking agent that enables the partial crosslinking of the sealing composition comprising the styrene thermoplastic elastomer.

The sealing composition can comprise (b) elastomeric polymers and/or copolymers with at least one unsaturated chain having a glass transition temperature (Tg) generally lower than 20° C., preferably in the range of from 0° C. to −110° C.

These polymers or copolymers can be of natural origin or can be obtained by polymerization in solution, polymerization in emulsion or gas-phase polymerization of one or more conjugated diolefins, optionally blended with at least one comonomer selected among monovinylarenes and/or polar comonomers in an amount not higher than 60% by weight. The conjugated diolefins generally contain from 4 to 12, preferably from 4 to 8 carbon atoms and can be selected, for example, from the group comprising: 1,3-butadiene, isoprene, 2,3-dimethyl-1,3-butadiene, 1,3-pentadiene, 1,3-esadiene, 3-butyl-1,3-octadiene, 2-phenyl-1,3-butadiene or mixtures thereof. 1,3-butadiene or isoprene are particularly preferred.

Polar comonomers which can optionally be used can be selected, for example, among: vinylpyridine, vinylquinoline, acrylic acid and alkylacrylic acid esters, nitriles or mixtures thereof, such as, for example, methyl acrylate, ethyl acrylate, methyl methacrylate, ethyl methacrylate, acrylonitrile or mixtures thereof.

Preferably the natural or synthetic elastomer included in the sealing material can be selected, for example, among: cis-1,4-polyisoprene (natural rubber or synthetic polyisoprene), 3,4-polyisoprene, polybutadiene (in particular polybutadiene with a high 1,4-cis content), 1,3-butadiene/acrylonitrile copolymers, styrene/1,3-butadiene copolymers, styrene/isoprene/1,3-butadiene copolymers, styrene/1,3-butadiene/acrylonitrile copolymers or mixtures thereof.

Suitable crosslinking agents (c) are sulfur or molecules containing sulfur, in the presence of compounds containing zinc and fatty acids or peroxides.

Specific examples of molecules containing sulfur which can be used as crosslinking agents in the sealing materials for the preparation of self-sealing tyres are elemental sulfur, thiurams, such as tetraisobutyl thiuram disulfide or tetrabenzyl thiuram disulfide, or dithiophosphates, such as zinc dibutyldithiophosphate, or dithiocarbamates, such as zinc dimethyl dithiocarbamate, with ZnO or compounds containing zinc, fatty acids and sulfenamides, such as N-t.butyl-2-benzothiazyl sulfenamide (TBBS) or N-cyclohexyl-2-benzothiazyl sulfenamide (CBS) or thiazoles, such as 2,2'-dithiobis-(benzothiazole) (MBTS).

Specific examples of peroxides that can be used as crosslinking agents in the sealing materials for the preparation of self-sealing tyres are organic peroxides, such as dicumyl peroxide (DCP), 2,5-dimethyl-2,5-di(t.butyl-peroxy)hexane (DBPH), bis-(2,4-dichlorobenzoyl) peroxide (DCBP), di-t.butyl-peroxide.

A peroxide, more preferably 2,5-dimethyl-2,5-di(t.butyl-peroxy)hexane (DBPH), is preferably used as a crosslinking agent.

A specific example of DBPH which can be used is a DBPH mixture at 50% in oil sold under the trademark LUPEROX 101 M050 by Arkema.

The amount of peroxide is preferably from about 0.1 phr to about 6 phr.

The presence of peroxide or sulphur or another crosslinking agent enables the partial chemical crosslinking of the sealing composition comprising the unsaturated styrene thermoplastic elastomer during the vulcanization of the tyre so improving the dynamic sealing characteristics of the layer of sealing material.

The sealing composition generally comprises other components commonly used in self-sealing compositions, such as for example, resins and plasticizers.

The resins (d) can be aliphatic resins, aromatic resins and natural resins such as rosin based resins or terpene based resins.

Examples of commercial products of aliphatic resins are Escorez® 1102 (produced by ExxonMobil), Piccotac® 1100-E (produced by Eastman), Wingtack® 95 (produced by Cray Valley).

Examples of aromatic resins are phenolic based resins such as resins with an alkylphenol-formaldehyde base and derived resins modified with rosin, resins with an alkylphenol-acetylene base, alkylphenol and terpene phenol modified resins. Specific examples indicated by their trademark include commercial products such as HITANOL® 1502 (produced by Hitachi Kasei Co., Ltd.) which is an alkylphenol novolac resin, RESINA SP-1068 (produced by SI Group Inc.) which is an octylphenol-formaldehyde resin and KORESIN® (produced by BASF Company) which is a p-t.butylphenol-acetylene resin.

Further examples of aromatic resins are carbon based resin which include coumarone-indene resins. Specific examples include commercial products, indicated by their trademark, such as resins NOVARES® C (produced by Rutgers Chemical GmbH) which are coumarone-indene synthetic resins (for examples NOVARES® C10, C30 and C70).

Other examples of aromatic resins are xylene based resins such as xylene-formaldehyde resins.

Said resins can be used alone or mixed with each other.

Aliphatic resins optionally mixed with one or more aromatic resins are preferably used.

The extension oils can be polyolefin oils, paraffinic oils, naphthalene oils, aromatic oils, mineral oils or mixtures thereof.

Paraffinic oils are preferred.

The composition can comprise up to 50 phr of a charge, such as calcium carbonate, carbon black, precipitated silica, kaolin, talc or mixtures thereof and 0.1-5 phr of stabilizing agents and antioxidants.

Preferably, the layer of sealing material has a thickness lower than about 6 mm.

The layer of sealing material has preferably a thickness between about 1 mm and about 6 mm.

The layer of sealing material has preferably a thickness between about 3 mm and about 6 mm.

The application of the layer of sealing material is preferably made during the preparation of the green tyre.

The layer of sealing material can be applied on a removable protective layer that allows its handling and storage and then covered by a self-supporting thermoplastic film.

The sealing layer and the self-supporting film form a sealing complex advantageously easier to handle and more effective in the sealing during the working of the self-sealing tyre.

Rubber strips can be applied on the sidewall of the obtained sealing complex to contain the layer of sealing material during vulcanization. The resultant sealing complex is transported, cut to size and applied on a packing drum with the self-sealing thermoplastic film in contact with the surface of the drum after removal of the protective layer. At least one air-tight element (liner), one carcass structure and others structural elements (belts, sidewalls, tread etc.) are then applied over at least said forming drum to obtain a green tyre according to conventional techniques.

The layer of sealing material can be also prepared separately, for example by extrusion, with a thickness and width suitable for being then transferred with any suitable means on the desired area of a structural element of the tyre.

The air-tight layer (liner) can be prepared by a composite film comprising elastomers and thermoplastics (preferably nylon), or can be prepared with a composition of any crosslinkable elastomeric material which is able to provide the necessary required impermeability in a tyre without the inner tube at rated pressure. The air-tight layer is formed preferably mainly by a butyl rubber (IIR) and by an halogenated butyl rubber (XIIR).

Further characteristics and advantages will become more apparent from the detailed description of a preferred but non-exclusive embodiment, of a self-sealing tyre for vehicle wheels according to the present invention.

Said description will be described herein below with reference to the reported drawing that schematically shows in a radial half section an embodiment of a self-sealing tyre for vehicle wheels according to the present invention given for exemplificative and non-limitative purposes only.

DETAILED DESCRIPTION OF THE EMBODIMENTS OF THE INVENTION

With reference number 1 a self-sealing tyre for vehicle wheels is indicated in the FIGURE, which generally comprises a carcass structure 2 comprising at least a carcass ply 3 having end flaps respectively opposite to respective annular anchoring structures 4, optionally associated with elastomeric fillers 4a, integrated into regions 5 usually identified by the name of "beads". The carcass ply 3 comprises a plurality of reinforcing textile or metallic cords placed in a parallel position to each other and at least partially coated with a layer of an elastomeric material.

Associated to the carcass structure 2 is a belt structure 6 comprising one or more belt layers disposed in a radial superposed position with each other and with respect to the carcass ply 3, having typical metallic reinforcing cords. Such reinforcing cords can have a cross orientation with respect to the direction of the circumferential extension of tyre 1.

A tread band 7 of elastomeric material, as other semi-worked components of the tyre 1 is applied at a radially outer position to the carcass structure 6.

On the side surfaces of the carcass structure 2, each extending from one of the side edges of the tread band 7 until close to the respective annular anchoring structure to the beads 5, are further applied respective sidewalls 8 of elastomeric material in an axially external position.

Moreover, a radially inner surface of tyre 1 is preferably internally coated with a layer of substantially air-tight elastomeric material or so-called liner 9.

Moreover, the self-sealing tyre comprises a layer of sealing polymeric material 10 placed in correspondence with the crown area of tyre 1 and at a radially inner position respective to liner 9. The layer of sealing polymeric material 10 extends for the entire circumferential development of tyre 1. The layer of sealing material 10 presents a maximum thickness "t1" substantially in correspondence to the equatorial plane "X" of the finished tyre 1, that is printed and vulcanized, and tapers towards the axial ends of the crown area. Said maximum thickness "t1" is preferably lower than about 6 mm. Said maximum thickness "t1" is between about 3 mm and about 6 mm.

The layer of sealing material of the finished tyre 1 comprises a partially chemically crosslinked unsaturated styrene thermoplastic elastomer.

At a radially inner position with respect to the layer of sealing polymeric material 10 and directly in contact with said sealing polymeric material 10 a self-supporting thermoplastic film 11 is arranged. The self-supporting thermoplastic film 11 extends, as the layer of sealing polymeric material 10, for the entire circumferential development of tyre 1 and has a length, that is an axial extension, slightly lower than the axial extension of said layer 10.

The self-supporting thermoplastic film 11 is preferably in polyamide selected among: nylon 6, nylon 66, nylon 46, nylon 11, nylon 12, nylon 610, nylon 612, nylon 6/66 copolymer, nylon 6/66/610 copolymer, nylon MXD 6, nylon 6T, nylon 6/6T copolymer, nylon 66/PP copolymer, nylon 66/PPS copolymer, used alone or in combination. The self-supporting thermoplastic film 11 is preferably in polyester selected among: polybutylene terephthalate (PBT), polyethylene terephthalate (PET), polyethylene isophthalate (PEI), polybutylene terephthalate/tetramethylene glycol copolymer, PET/PEI copolymer, polyarylate and polybutylene naphthalate.

Said self-supporting thermoplastic film has preferably a layer thickness lower than 50 μm.

The layer of sealing polymeric material 10 and the self-supporting thermoplastic film 11 form a sealing complex 12. The sealing polymeric material 10, when a sharp element (such as a nail) enters the tyre and passes through the sealing complex 12, is able to adhere to the object inserted therein and can further flow inside the puncture when said object is removed, thereby sealing the puncture itself and preventing the outflow of air from the tyre.

The sealing complex 12 in the preferred and illustrated embodiment further comprises two lists of elastomeric material 13, each arranged at the edge of the same. An axially internal portion 13a of each elongated list of elastomeric material 13 overlaps the sealing complex 12 and is placed at a radially inner position to said sealing complex 12. An axially outer portion 13b of each list of elastomeric material 13 is directly in contact with liner 9. By axially inner portion 13a it is intended a portion that is closer to an equatorial plane "X" of tyre 1 with respect to the axially outer portion 13b. In more detail, the axially inner portion 13a has in turn an axially inner region directly applied to the self-supporting thermoplastic film 11 and an axially outer region directly applied on the surface of the layer of sealing polymeric material 10.

The layer of the sealing polymeric material 10 presents in fact an axial extension greater than the axial extension of the self-supporting thermoplastic film 11. As a result every lists of elastomeric material 13 is directly in contact with both the layer of sealing polymeric material 10 and the self-supporting thermoplastic film 11.

According to an alternative embodiment, not illustrated, the sealing material is applied on the liner which is applied in advance on a development drum. The self-supporting thermoplastic film may not be present.

The above described tyre 1 is packed by assembling the components on one or more development drums.

For example, an installation for the preparation of self-sealing tyres 1 comprises a carcass packaging line, in correspondence to which, development drums 14 are moved among different delivery stations of semi-worked products, able to form on each development drum 14, a carcass sleeve comprising: a sealing complex 12, a carcass structure 3, a liner 9, the annular anchoring structures 4 and optionally at least a sidewall portion 8. At the same time, in a packaging line of external sleeves, one or more auxiliary drums are sequentially moved among different work stations predisposed to form on each auxiliary drum an external sleeve comprising at least a carcass structure, a tread band 7 and optionally at least a sidewalls portion 8.

The installation further comprises an assembling station in correspondence to which the external sleeve is coupled with the carcass sleeve. The packaged tyres 1 are finally transferred to at least one molding and vulcanizing unit.

The composition and the thickness of the sealing layer material are selected in relation to the type of tyre to be produced so as to give the optimal viscoelasticity and stickiness features for each use conditions of the tyre itself.

The Applicant took care to apply the invention to tyres for four-wheeled vehicles for use on the road, such as tyres adapted to equip small, medium and high powered cars for people transport (measures of the chord from 145 mm to 245 mm).

The invention is also suitable for tyres for small runabouts as well as or for high-performance tyres (HP high performances-UHP ultra high performances). With appropriate adjustments according to the present invention self-sealing tyres for different vehicles such as motorvehicles, motorbicycles or heavy vehicles for transport of person or things can be realized.

In the embodiment illustrated in FIG. 1, tyre 1 is for vehicles.

Typically, in this case, the belt structure 6 further comprises at least an outer radial layer comprising textile cords which are arranged according to a substantially zero angle with respect to the circumferential development direction of the tyre.

According to other embodiments of the present invention, the tyre is for heavy vehicles. With the expression "heavy vehicle" it is generally intended a vehicle belonging to categories M2~M3, N1~N3 and O2~O4 defined in "Consolidated Resolution of the Construction of Vehicles (R.E.3) (1997)", Annex 7, pages 52-59, "Classification and definition of power-driven vehicles and trailers", such as for example lorries, lorries with trailers, tractors, buses, vans and other vehicles of this type. The belt structure of a tyre for heavy vehicles (not shown) typically comprises a belt layer commonly known with the name "gravel-guard belt" which is the radially outermost layer of the belt structure and acts as a protective layer against penetration of stones and/or gravel into the innermost layers of the tyre structure. Preferably, the belt structure of a tyre for heavy vehicles further comprises a side reinforcing strip that can be radially superposed on the second belt layer in correspondence to an axial end thereof. The side strip incorporates a plurality of reinforcing elements, preferably high-elongation metallic cords. Preferably, in addition, an insert is arranged substantially in correspondence to the shoulder portion, that is the portion where the side end of the tread band joins the sidewall. In particular, the insert has a portion that is substantially interposed in a radial direction between the belt structure and the tread band and a portion that is substantially interposed in an axial direction between the carcass and the sidewall.

In accordance with further embodiments of the present invention the tyre is intended for motorvehicles. The profile of the right section of the tyre for motorvehicles (not shown) has a high cross camber as it must ensure a sufficient footprint area in all inclination conditions of the motorvehicle. The cross camber is defined by the value of the ratio between the distance f of the tread centre from the line passing through the laterally opposite ends of the tread itself, measured in the equatorial plane of the tyre, and the width C defined by the distance between the lateral opposite ends of the tread itself. By tyre with a high cross camber it is denoted a tyre the camber ratio (f/C) of which is of at least 0.20. Preferably (f/C) is respectively between 0.20 and 0.5 for a rear tyre and between 0.35 and 0.6 for a front tyre.

In order to better illustrate the present invention, without however limiting it, the following examples are now given.

Example 1

The sealing compositions given in Table 1 were prepared from a SIS block copolymer obtained from the manufacturer in form of granules having an average particle size from about 2 mm to about 8 mm.

The SIS block copolymer and the resin (also in granular form) were charged into a hopper of a co-rotating screw extruder (Maris TM40HT having a screw nominal diameter of about 40 mm and a L/D ratio between length and diameter of about 48). The oil was added through two injectors in the central section of the extruder, the peroxide was added as a solution in oil through an injector in the second longitudinal half-portion of the extruder. The maximum temperature of the extruder was 180° C. The head of extrusion was kept at a temperature of about 100° C.

The extruder operated at a flow rate of 30 Kg/h the composition was removed from the head of extrusion at a temperature of about 135° C.

The resultant sealing composition, discharged from the extruder in the form of a continuous band, was cooled at room temperature in a cooling device.

The inserted nails were extracted and the sealing was checked, plugging with a nail or with a rubber repairing the punctures from which outflows of air such to deflate the tyre in a few hours were detected. Then 20 km were run with a load of 550 kg and a zero slip angle from −2% to +2% and the sealing was checked again.

TABLE 1

| Ingredient | 1* | 2* | 3* | 4 | 5 | 6 | 7 |
|---|---|---|---|---|---|---|---|
| Peroxide (phr) and | — | 2 | — | 4 | 2 | 2 | 2 |
| (phr excluding oil) | | (0.5) | | (1) | (0.5) | (0.5) | (0.5) |
| SIS T190 (phr) | 100 | 100 | | 100 | 100 | | 80 |
| SIS T9133(phr) | | | 100 | | | 100 | |
| IR | | | | | | | 12 |
| SBR | | | | | | | 8 |
| Oil (phr) | 100 | 100 | 20 | 100 | 50 | 20 | 20 |
| Resin (phr) | 140 | 140 | 140 | 140 | 140 | 140 | 100 |
| S' (dNm) | 0.81 | 1.16 | 3.35 | 0.95 | 1.59 | 3.09 | 3.11 |
| V (meqv crosslinking agent/ 100 g composition | | 1.0 | | 2.0 | 1.2 | 1.3 | 1.6 |
| A | | 1.2 | | 1.9 | 1.9 | 4.0 | 4.8 |

*comparative
Peroxide: 2,5-dimethyl-2,5-di(t.butyl-peroxy)hexane (DBPH) at 25% in oil - Arkema Luperox 101
SIS T190: block copolymer styrene/isoprene/styrene - 16% styrene, 25% di-block, Europrene ® SOL T190
SIS T9133: block copolymer styrene/isoprene/styrene - 16% styrene, 55% di-block, Europrene ® SOL T9133
Oil: aliphatic oil - Repsol Extensoil ® 265
Resin: aliphatic adhesive resin Escorez ® 1102 (produced by ExxonMobil)
IR: cis-1,4-polyisoprene Rubber SKI-3 Group II supplied by Nizhnekamsk
SBR: styrene-butadiene copolymer at 23% of polymerized styrene in emulsion, ASTM degree 1502
S': value of the moment of torque force in phase with the deformation measured before crosslinking, measured with an oscillating room rheometer "Rubber Process Analyser" by Alpha Technologies at 50° C., at 25% dynamic deformation and at 10 Hz
A: resultant value from V × S'

For the tests Pirelli® Cinturato P7®235/40 R18 tyres, made self-sealing by applying a sealing layer having a thickness of about 3 mm comprising the sealing composition of the sample 4 in table 1 on a radially inner layer, substantially air-tight were used. The tyres were fitted on standard rims and were inflated at a pressure of about 2.5 bar.

Static Test

The tyres were punctured with three sets of 6 nails, 40 mm long and with a diameter of 3, 4 and 5 respectively. A set of tyres were left in storage for 72 hours with the inserted nails and a set of tyres was left in storage for 72 hours after the extraction of the nails. At the end of these period, all the tyres were found substantially inflated.

Dynamic Test

Nails of a 3, 4 and 5 mm of diameter and 40 mm long were inserted through the tread of an tyre inflated to a 240 kPa pressure. The tread region to be punctured corresponded to the belts. The nails arrangement included blocks and grooves and was random on the circumference.

Each casing was set in a rolling movement with the inserted nails on a so-called "roller bench", a disc of 2.8 m diameter, at the speed of 120 km/h with a load of 550 kg.

500 km were covered alternating periods of 10 minutes with a zero drift angle with periods of 10 minutes with a drift angle oscillating from −6° to +6°. The drift speed was 1°/s, then 25 oscillations for each drift cycle were carried out. The covers did not leak air over the whole test period.

At the end of the test the temperature of each tyre was measured, particularly the temperature of the tread, that was about of 70° C. and the internal air temperature of the tyre, that was about 60-65° C.

On the base of these measurements, the Applicant estimated with good approximation that the temperature of the sealing material (of complex detection during rolling) was slightly higher than that of the tread (as during the test it rolls in contact with the roller bench which is relatively cooler). The temperature of the sealing material during the test was evaluated from 75° C. to 85° C.

The outflow of air from the punctures was checked with a soapy water solution.

The results are summarized in the following table 2 as number of sealed punctures for each nail diameter over the total number of nails (per tyre per diameter). It was further reported the average of sealings measured on the sealings of all the punctures (3 mm, 4 mm, 5 mm). The punctures in correspondence to which did not appear an immediate formation of foam with soapy water were considered as sealed, that is to say both completely sealed punctures and punctures in correspondence to which there is the formation of small air bubbles in a few seconds: such punctures experimentally lead to a leak of air of fractions of bars per day or lower from the tyre and are so compatible with the sealing scope, that is to enable an "extended mobility" in case of puncture, rather than a permanent repair.

TABLE 2

| | nail | 1* | 2* | 3* | 4 | 5 | 6 | 7 |
|---|---|---|---|---|---|---|---|---|
| Immediate | 3 mm | 33% | 33% | 100% | 100% | 100% | 100% | 100% |
| crosslinking | 4 mm | 33% | 33% | 58% | 67% | 67% | 58% | 67% |
| after | 5 mm | 0% | 33% | 0% | 33% | 58% | 33% | 58% |

TABLE 2-continued

| | nail | 1* | 2* | 3* | 4 | 5 | 6 | 7 |
|---|---|---|---|---|---|---|---|---|
| extraction at 500 Km | | | | | | | | |
| Average immediate sealing | | 22% | 33% | 53% | 67% | 75% | 64% | 75% |
| Sealing after 500 Km + 20 Km | 3 mm | 0% | 33% | 100% | 100% | 100% | 100% | 100% |
| | 4 mm | 0% | 25% | 58% | 75% | 67% | 67% | 67% |
| | 5 mm | 0% | 0% | 0% | 42% | 58% | 33% | 58% |
| Average sealing after + 20 km without nails | | 0% | 19% | 53% | 72% | 75% | 67% | 75% |
| Status of the sealing layer at the end of the proof | | moved | slight moved | slight moved | steady | steady | steady | steady |

*comparative

With the aim to allow an "extended mobility" in case of puncture and the concurrent need not to repair punctures such to endanger the integrity of the tyre, the sealing target achieved by the tyres according to the invention was to obtain a performance of sealing limited to sharp elements up to 5-6 mm diameter.

During the test with inserted nails for 500 km the Applicant considered the sealing test passed when the all smallest punctures, up to 3 mm diameter, almost all of the punctures of 4 mm and a good portion of punctures of 5 mm diameter were sealed. It was considered acceptable a medium sealing level (obtained as average of positive sealings) of 65% after the dynamic test run per 500 km+20 km, provided that 100% of punctures of 3 was sealed also at relative high operating temperatures (higher than 70° C.).

Static Sealing Test with Nails of 10 mm

A Pirelli® Cinturato P7® 235/40 R18 tyre, made self-sealing by applying a sealing layer having a thickness of about 3 mm comprising the sealing composition of the sample 4 in table 1 on a radially inner layer, substantially air-tight.

The obtained tyre underwent a static sealing test. Two nails of 10 mm diameter with 40 mm length were inserted through the tread of a tyre inflated to a pressure of 240 kPa.

The tread region to be punctured corresponded to the belts with arrangement of the nails in the tread blocks.

The inserted nails were extracted and the eventual leak of air was checked with soapy water solution.

Result: two punctures of 10 mm leak of air detected.

The sealing was already excluded in the test carried out in static condition for punctures caused by sharp elements of potentially dangerous dimensions (10 mm) according to the experiences of the Applicant.

It was possible to see how the tyre prepared according to the invention allowed a selective control of the sealing.

The invention claimed is:

1. A self-sealing tyre for vehicle wheels obtained by vulcanizing a green self-sealing tyre comprising:
   a carcass structure, a tread band applied in a radially external position to said carcass structure at least in a crown area of the tyre, a liner applied in a radially inner position to said carcass structure, and a layer of sealing material applied in a radially inner position to said carcass structure and which extends axially at least in all the crown area of the tyre, said layer of sealing material comprising at least a layer of sealing material comprising a sealing composition comprising:
   (a) at least 20 phr of at least an unsaturated styrene thermoplastic elastomer;
   (b) from 0 phr to 80 phr of at least a diene elastomer;
   (c) from 4 phr to 6 phr of a crosslinking agent, the amount of the crosslinking agent in the sealing composition being such that:

$V \times S'(10\ Hz) = A$ wherein:
   V is an amount of the crosslinking agent expressed in meqv/100 g of composition;
   S' is a value of a moment of torsion strength in phase with deformation of the sealing material detected before crosslinking, expressed in dNm, measured with an oscillating rheometer at 50° C., at 25% of dynamic deformation and at 10 Hz; and
   A is a parameter with value higher than 1.4; and
   (d) from 100 to 200 phr of an extension oil.

2. The self-sealing tyre according to claim 1, wherein the value of parameter A is lower than 10.

3. The self-sealing tyre according to claim 1, wherein the value of parameter A is from 1.7 to 7.

4. The self-sealing tyre according to claim 1, obtained by vulcanizing a green self-sealing tyre comprising at least a layer of sealing material comprising:
   (a) at least 30 phr of at least one unsaturated styrene thermoplastic elastomer.

5. The self-sealing tyre according to claim 1, wherein said sealing composition comprises:
   (a) from 40 phr to 100 phr of at least one unsaturated styrene thermoplastic elastomer.

6. The self-sealing tyre according to claim 1, wherein said sealing composition comprises:
   (b) from 10 phr to 50 phr of at least one diene elastomer.

7. The self-sealing tyre according to claim 1, wherein said sealing composition further comprises at least 20 phr of at least one adhesive resin.

8. The self-sealing tyre according to claim 7, wherein the adhesive resin is selected from aliphatic resins, aromatic resins, natural resins and mixtures thereof.

9. The self-sealing tyre according to claim 1, wherein said sealing composition further comprises from 30 phr to 200 phr of at least one adhesive resin.

10. The self-sealing tyre according to claim 1, wherein the unsaturated styrene thermoplastic elastomer is a styrene polymer selected from block copolymers styrene/butadiene/styrene, styrene/isoprene/styrene, styrene/butadiene/isoprene/styrene, styrene-butadiene, styrene-isoprene, and mixtures thereof.

11. The self-sealing tyre according to claim 10, wherein the unsaturated styrene thermoplastic elastomer is selected from styrene-butadiene and styrene-isoprene.

12. The self-sealing tyre according to claim 10, wherein the unsaturated styrene thermoplastic elastomer is selected from the block copolymer styrene/isoprene/styrene or mixtures of one or more unsaturated styrene thermoplastic elastomers comprising at least 50% of block copolymer styrene/isoprene/styrene.

13. The self-sealing tyre according to claim 10, wherein the block copolymer has a styrene content from 10% to 30%.

14. The self-sealing tyre according to claim 10, wherein the block copolymer has a "di-block" percentage lower than 70%.

15. The self-sealing tyre according to claim 1, wherein the crosslinking agent is selected from sulfur and molecules containing sulfur, and the sealing composition further comprises fatty acids or compounds containing zinc.

16. The self-sealing tyre according to claim 1, wherein the crosslinking agent is a peroxide.

17. The self-sealing tyre according to claim 16, wherein the crosslinking agent is selected from dicumyl peroxide, 2,5-dimethyl-2,5-di(t.butyl-peroxy)hexane, bis-(2,4-dichloro-benzoyl)peroxide and di-t.butyl-peroxide.

18. The self-sealing tyre according to claim 17, wherein the peroxide is 2,5-dimethyl-2,5-di(t.butyl-peroxy)hexane.

19. The self-sealing tyre according to claim 1, wherein said at least one diene elastomer is selected from elastomeric polymers and/or copolymers with at least an unsaturated chain having a glass transition temperature (Tg) lower than 20° C.

20. The self-sealing tyre according to claim 1, wherein the extension oil is selected from polyolefin oils, paraffinic oils, naphthenic oils, aromatic oils, mineral oils and mixtures thereof.

21. The self-sealing tyre according to claim 1, wherein said tyre comprises a carcass structure, a tread band applied in a radially external position to said carcass structure at least in a crown area, at least a liner applied in a radially inner position to said carcass structure, a sealing complex applied in a radially inner position to the liner and which axially extends at least in all the crown area of the tyre; said sealing complex comprising at least a self-supporting thermoplastic film and a layer of sealing material associated with and supported by said self-supporting thermoplastic film.

22. A process for the preparation of a self-sealing tyre for vehicle wheels comprising:
preparing a layer of sealing material; wherein the preparation of the layer of sealing material comprises:
feeding in a mixer comprising a housing, at least a screw revolving assembled in said housing comprising at least a feed opening and a discharge opening, said sealing composition comprising:
(a) at least 20 phr of at least an unsaturated styrene thermoplastic elastomer;
(b) from 0 phr to 80 phr of at least a diene elastomer;
(c) from 4 phr to 6 phr of a crosslinking agent,
wherein the amount of the crosslinking agent in the sealing composition is such that:

$$V \times S'(10\ Hz) = A$$

wherein:
V is an amount of the crosslinking agent expressed in meqv/100 g of composition;
S' is a value of a moment of torsion strength in phase with deformation of the sealing material detected before crosslinking, expressed in dNm, measured with an oscillating rheometer at 50° C., at 25% of dynamic deformation and at 10 Hz; and
A is a parameter with value higher than 1.4; and
(d) from 100 to 200 phr of an extension oil;
mixing said sealant composition; and
discharging said sealant composition from the mixer using the discharge opening;
forming a green tyre comprising a carcass structure, a tread band applied in a radially external position to said carcass structure at least in a crown area of the tyre, a liner applied in a radially inner position to said carcass structure, and said layer of sealing material applied in a radially inner position of said carcass structure and which extends axially at least in all the crown area of the tyre; and
conforming, molding and vulcanizing said green tyre.

23. The process for the preparation of a self-sealing tyre for vehicle wheels according to claim 22, wherein the value of parameter A is lower than 10.

24. The process for the preparation of a self-sealing tyre for vehicle wheels according to claim 22, wherein preparation of the layer of sealant material further comprises feeding of at least an adhesive resin to said mixer.

25. The process for the preparation of a self-sealing tyre for vehicle wheels according to claim 22, wherein mixing said sealing composition is carried out at a temperature from 20° C. to 300° C.

26. The process for the preparation of a self-sealing tyre for vehicle wheels according to claim 22, wherein said mixer is a sigma (Z-blades) mixer.

27. The process for the preparation of a self-sealing tyre for vehicle wheels according to claim 22, wherein said mixer is a multi screw extruder.

* * * * *